(No Model.) 2 Sheets—Sheet 2.
J. URBANEK.
CORN PLANTER.
No. 603,801. Patented May 10, 1898.
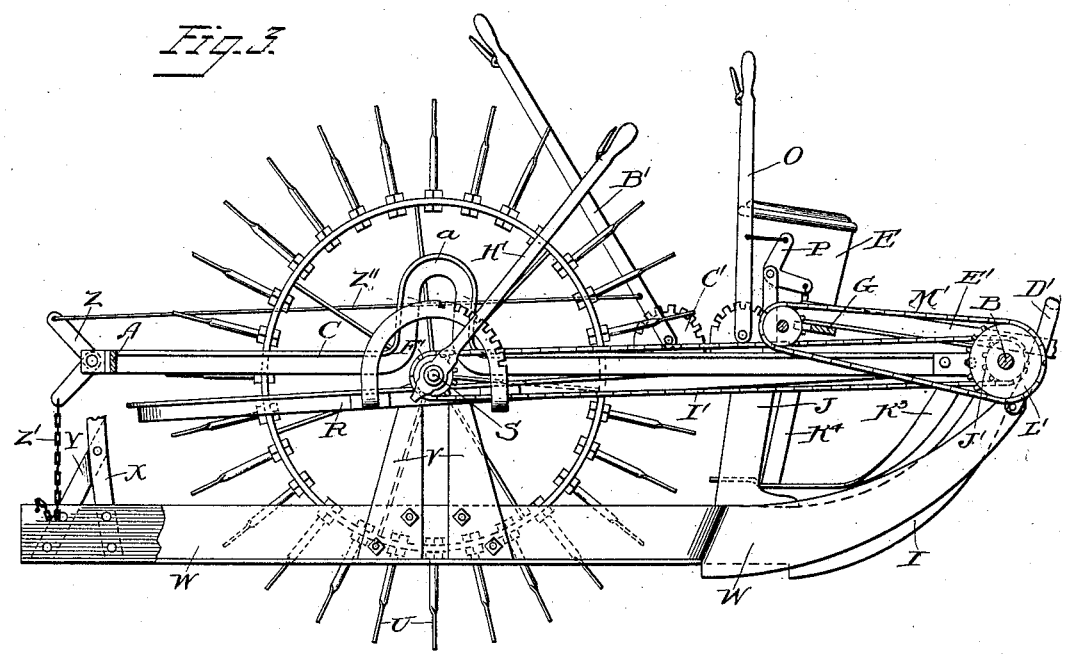
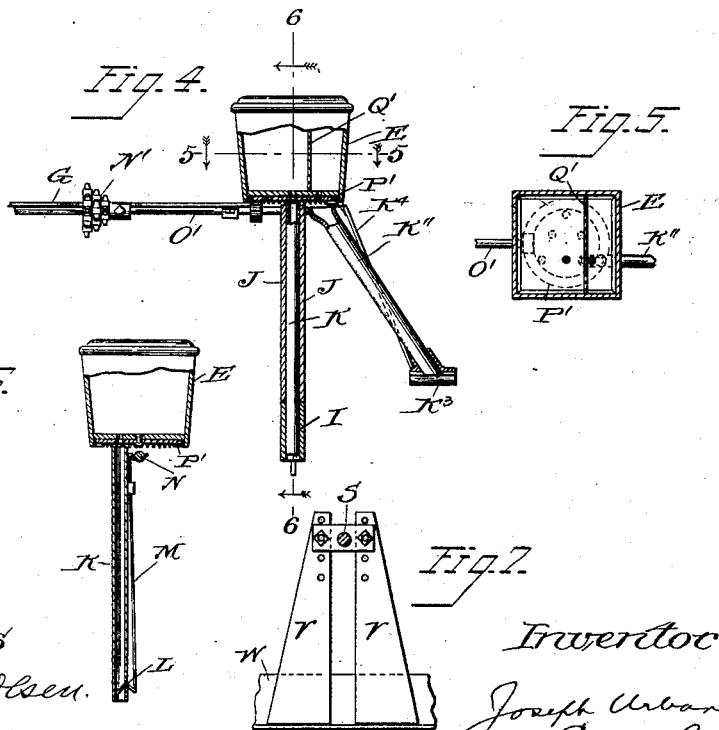
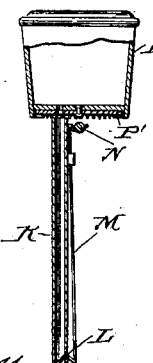
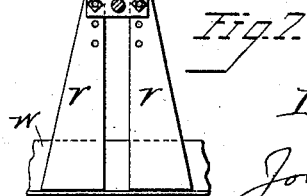
Witnesses
Martin H. Olsen.
Leonora Wiseman
Inventor
Joseph Urbanek
by Edward Rector
his atty

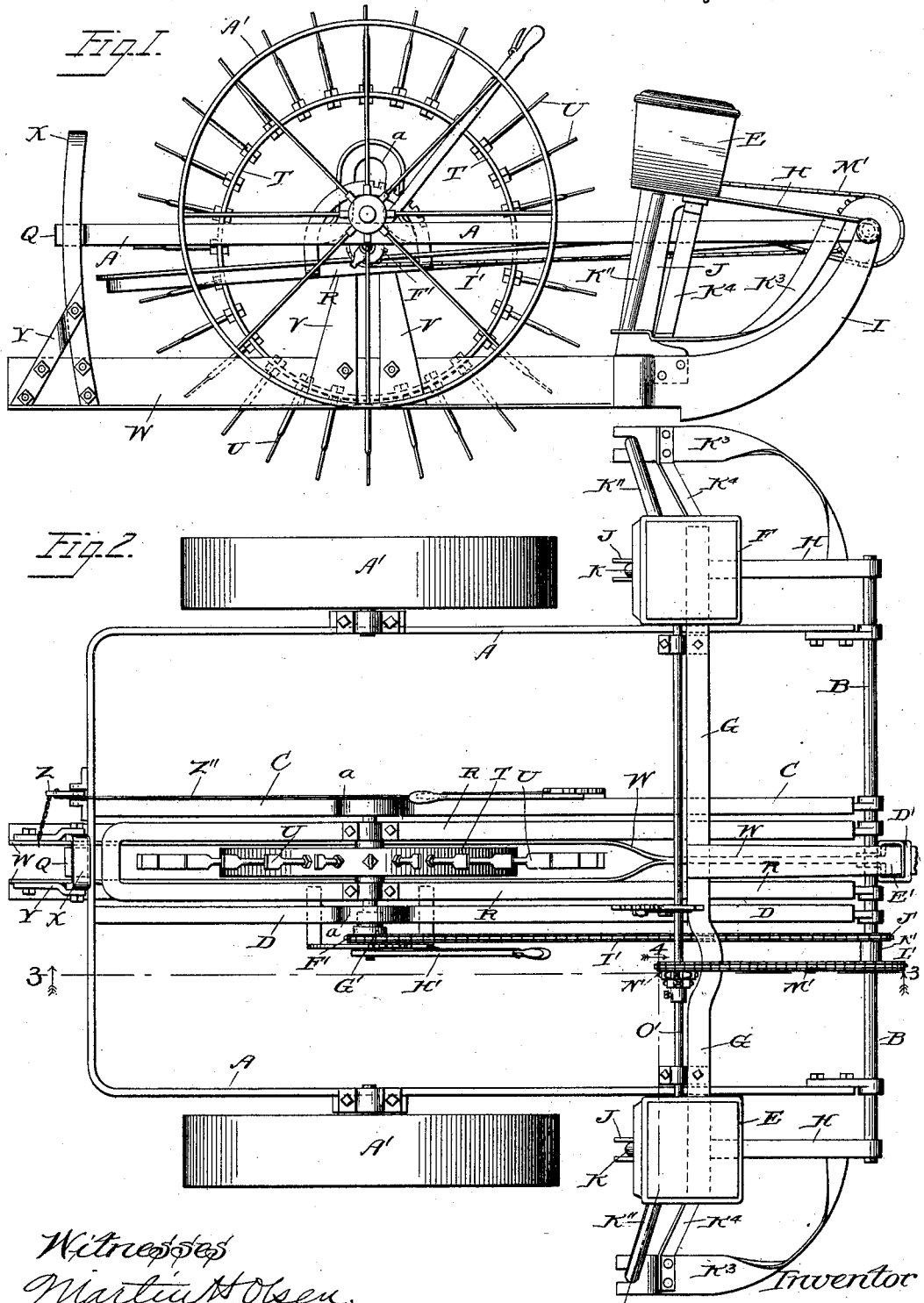

UNITED STATES PATENT OFFICE.

JOSEPH URBANEK, OF SCHUYLER, NEBRASKA, ASSIGNOR OF TWO-THIRDS TO THOMAS E. MOLACEK AND MORRIS PALMER, OF SAME PLACE.

CORN-PLANTER.

SPECIFICATION forming part of Letters Patent No. 603,801, dated May 10, 1898.

Application filed October 9, 1897. Serial No. 654,658. (No model.)

*To all whom it may concern:*

Be it known that I, JOSEPH URBANEK, a citizen of the United States, residing at Schuyler, in the county of Colfax, in the State of Nebraska, have invented a certain new and useful Improvement in Corn-Planters, of which the following is a description, reference being had to the accompanying drawings, forming part of this specification.

My invention relates to that class of corn-planters which plant the corn in hills at equal distances apart and in straight lines across the field in both directions; and it has for its principal object the provision of a planter for satisfactorily doing this work without the "check-row" devices which have heretofore been used in connection with such planters.

To this end the principal feature of my invention consists in the employment of a novel spacing and driving wheel which is mounted in a floating frame hinged to the main frame of the planter and having as its essential feature a long shoe or runner adapted to rest upon the surface of the ground and through or beyond which the teeth of the spacing-wheel project. Driving connections are interposed between this spacing-wheel and the seed-dropping devices of the planter for actuating the latter to drop the seed at regular intervals in the forward travel of the planter.

A second important feature of my invention relates to the provision of a novel marker, consisting of an auxiliary dropping device operated in unison with the main dropping devices of the planter, by which a deposit of some suitable marking substance may be made upon the surface of the ground opposite each hill that is planted, so that the position of the hills may be thus readily observed by the driver as he drives back and forth across the field and enable him to so regulate the dropping devices or readjust them when necessary as to insure the planting of the hills in straight lines across the field at right angles to the travel of the planter, so that the planting of the hills in straight lines both ways across the field may be insured.

My invention embodies other features of novelty, all of which will be hereinafter more fully explained, and particularly pointed out in the claims.

In the accompanying drawings, Figure 1 represents an elevation of the right-hand side of my planter; Fig. 2, a top plan view thereof; Fig. 3, a vertical longitudinal section on the lines 3 3 of Fig. 2; Fig. 4, a sectional detail on the line 4 4 of Fig. 2; Fig. 5, a sectional detail on the line 5 5 of Fig. 4; Fig. 6, a sectional detail showing the means for operating the valve at the lower end of one of the feed-spouts, and Fig. 7 a detail view showing the adjustable connection between the long shoe or runner and the spacing-wheel shaft to which it is hung.

The same letters of reference are used to indicate corresponding parts in all the views.

The main frame of the machine may be of any suitable construction and is shown in the present instance as composed of an outside frame A, formed of a single bar of steel bent into rectangular shape and having its forward ends connected by a fixed rod or shaft B, and two longitudinal bars C D, located upon the opposite sides of but near the middle line of the machine and rigidly connecting the rear end of the frame A with the rod B, constituting the front end of the frame. This main frame is supported upon wheels A' A' at its opposite sides, as usual.

The hinged seedbox and runner-frame of the machine may be of the usual or any suitable construction and will not be illustrated or described in detail any further than is necessary to an explanation of my present invention. In the present instance said frame is shown composed of a cross-bar G, which carries the seedboxes E F at its opposite ends, and forwardly-extending arms H H, which are hung at their forward ends upon the rod B to furnish the hinged support for the frame. The arms H are connected at their upper forward ends with the upper ends of the runners I, and the rear end of each runner I is rigidly connected with the under side of the corresponding seedbox by two plates J J, secured at their lower ends between the forked rear ends of the runner and embracing between them the feed-spout K, Fig. 4, as usual. The valve L at the lower end of the feed-spout may be constructed and operated in the usual or any suitable manner, that in the present instance having shown connected to it a link M, which is provided at its upper end with a lug or projection coöperating with a tappet on the rotary shaft N, which drives the circular dropping-disk in the bottom of the feed-box, as hereinafter described.

The hinged runner-frame above described is raised and lowered and its position controlled by means of a detent-lever O, Fig. 3, connected through the medium of the bell-crank P with the cross-bar G of said frame.

The floating frame, which carries the spacing and driving wheel and the long shoe or runner heretofore referred to, consists of two parallel side bars R R, located on opposite sides of the middle line of the machine between the vertical planes of the longitudinal bars C D of the main frame and connected together at their rear ends and at their front ends hung upon the front rod B of the main frame. In the present instance this frame is formed of a single bar of angle-iron or steel bent into the desired shape, as shown in Fig. 2. Journaled in boxes upon the side bars R R of this floating frame is a rotary shaft S, and fast upon this shaft, midway between the two bars R R, is the wheel T, which has secured in and projecting from its rim the radial teeth U.

Hung upon the shaft S by arms V upon opposite sides of the wheel T is the long shoe or runner W, extending longitudinally of the machine from its forward to its rear end. The construction of this shoe or runner may be varied; but in the present instance it is shown as composed of two parallel plates having outwardly-projecting flanges along their lower edges from their rear ends to a point in front of the wheel T, at which latter point the flanges are bent downward to vertical position and the two plates bent inward and joined together and suitably cut away and curved upwardly to form a runner similar to the ordinary runners I I of the planter. The two plates are riveted or otherwise firmly secured together at their front ends and are also rigidly connected together at their rear ends, as hereinafter described. The teeth U of the wheel T extend downward between the two side plates of the runner W, so that with the runner resting upon the surface of the ground the teeth of the wheel may enter the ground to a considerable depth. In the drawings it may be assumed that the teeth project four or five inches below the lower surface of the runner. The position of the wheel relatively to the runner and the extent to which the teeth U project below the runner may be varied by means of the vertically-adjustable connection of the arms V with the shaft S. (Shown in Fig. 7.)

The rear ends of the two runner-plates W are rigidly connected by a vertical U-shaped frame X, whose lower ends are bolted to the runner-plates and which is also supported by additional braces Y, bolted to the runner-plates and to the frame X, Figs. 1 and 2. A projection Q upon the rear end of the main frame A of the machine extends between the vertical arms of this frame X, and the contact of said arms with the opposite sides of said projection limits the lateral movement of the runner W and serves to hold the latter in proper middle position.

Mounted upon the rear end of the main frame A at the left of the frame X, Figs. 2 and 3, is a bell-crank Z, whose lower arm is connected by a chain Z' with the rear end of the runner W and whose upper arm is connected by a rod Z'' with a detent-lever B', coöperating with the sector C', secured upon the longitudinal bar C of the main frame, by means of which lever and connections the rear end of the runner W and consequently the frame R, shaft S, and wheel T may be lifted from the ground when desired. To accommodate this lifting of the parts mentioned, the bars C D of the main frame are provided with U-shaped bends a above the shaft S.

From the foregoing description it will be understood that the floating frame R is loosely hung at its front end upon the front rod B of the main frame and is free to rise and fall at its rear end within the limits of movement permitted by the adjusting-lever B' and its connections. It will also be understood that said frame and the wheel T are supported upon the surface of the ground by the runner W (except when the lever B' is thrown forward) and that the runner W is of sufficient length to bridge any small gulleys or depressions in the surface of the ground and support the wheel T above them. The wheel is thus prevented from following any such slight inequalities in the ground, with the result that its revolution will be regular as the planter travels forward and not vary, as it would if the wheel were permitted to closely follow the surface of the ground. It results from this provision of the runner W that in the travel of the planter back and forth across the field the wheel T will not only turn at a regular speed proportionate to that of the planter, but will make substantially the same number of revolutions at each trip across the field, notwithstanding any slight differences in the surface of the ground encountered at one place or another.

While the runner W is shown and has been described as being hung by the arms V upon the shaft S, so that it is connected to the floating frame R through the medium of this shaft, it will be understood that this particular connection is not essential and that the runner might be pivotally hung to the frame R independently of said shaft.

The front end of the runner W might be hung upon the front rod B of the main frame, so that the frame R and runner W would move together, and some of the advantages of this feature of my invention be attained, but I prefer to leave the front end of the runner free for limited movement independently of the frame R, to which end the front end of the runner is provided with two upwardly-extending arms D', connected at their upper ends either by being bent from the same piece of metal or by means of a cross-bar, Fig. 2, which arms D' embrace the main draft tongue or pole E' of the machine, and by which latter the vertical movements of the front end of the runner W are limited. The tongue E is rigidly secured at its rear end to the cross-bar G of the hinged runner-frame of the planter heretofore described, and whenever said hinged frame is lifted by throwing the lever O rearward the tongue E' will be likewise lifted and will serve to lift the front end of the runner W, owing to its connection with the latter by the arms D', as above described. By throwing the lever O rearward, therefore, and the lever B' forward the runner W may be lifted entirely from the ground at both its front and rear ends, as when it is desired to turn the machine at the end of one trip across the field preparatory to making the return trip.

Loosely mounted upon the right-hand end of the shaft S, which is driven by the wheel T, is a sprocket-wheel F', and interposed between this sprocket and the shaft E is a friction-clutch G', controlled by a lever H', Figs. 2 and 3. The particular construction of this friction-clutch G' is immaterial, and it is not thought necessary to describe it in detail further than to say that by manipulating the lever H' the sprocket-wheel F' may be disconnected from the shaft S and adjusted about it and reconnected to it at will for the purpose hereinafter described. It is not even essential that the clutch shall be a friction-clutch, but I prefer to employ a friction-clutch to permit of nicer adjustments than could be effected with an ordinary positive clutch.

The sprocket-wheel F' is connected by a sprocket-chain I' with a sprocket-wheel J', fast upon a sleeve K', loosely mounted upon the front rod B of the main frame, Fig. 2. Fast upon the opposite end of the sleeve K' is a second sprocket L', which is connected by a chain M' with a sprocket N', fast upon a rotary shaft O', mounted in bearings upon the rear end of the cross-bar G of the runner-frame. By means of these connections the shaft O' is driven from the toothed wheel T and in turn drives the circular dropping-disk P' in the bottom of the seedbox F, Fig. 4. The particular construction of the dropping devices employed is entirely immaterial to my present invention, further than that they be actuated by connections with the toothed wheel T, and those shown in the drawings will not be further described in connection with this feature of my invention, excepting to say that the adjustments will be such that if the circumference of the toothed wheel T be approximately nine feet and it be desired to plant the hills of corn three feet apart the dropping devices will drop three times at each revolution of the wheel. By providing several sprockets N' of different sizes upon the shaft O', as shown in the drawings, the dropping devices may be driven at a greater or less speed to plant the hills at a less or greater distance apart, as may be desired.

The shaft O' extends longitudinally of the cross-bar G from the seedbox F to the seedbox E at the left-hand side of the machine and actuates the dropping devices of the seedbox E in the same manner as those of the seedbox F.

It will be understood from the foregoing description that as the planter is driven across the field in one direction a double row of hills will be planted at equal distances apart and that upon the return trip when the first two hills are planted in a straight line opposite the last two hills of the preceding trip the hills planted upon the return trip will, unless the surface of the ground be exceedingly irregular, be in line with the respective hills of the preceding trip, so that the hills planted by a series of trips back and forth across the field will stand in straight lines across the field in both directions. It may, however, be sometimes difficult to determine whether the first two hills planted upon the return trip are in exact line with the last two hills of the preceding trip, and if the surface of the ground be very irregular the driver cannot in the absence of some visible indication of the location of the hills planted upon preceding trips and some means for knowing just where the seed is being dropped upon the present trip, be sure that the hills are being planted in line with those of the previously-planted hills. For the purpose of enabling him to see the location of the hills planted on preceding trips and also the location of the hills being planted upon the present trip I have provided a novel marking device which constitutes the remaining feature of my invention. The novel marker consists of an auxiliary dropping device by means of which a deposit of some readily-visible substance is automatically made upon the surface of the ground opposite each hill that is planted. There is preferably one of these auxiliary markers in connection with each of the two seedboxes and dropping devices of the planter, although the provision of one may be found fairly satisfactory and be more economical. Any suitable substance readily visible upon the surface of the ground may be employed with this auxiliary marking device, but in the actual use which I have made of my machine I have for convenience used corn. As shown in Figs. 4, 5, and 6, the dropping-disks in the bottom of the seedboxes are provided with two sets of holes at different distances from the center of the disks, and the seedbox is divided by a partition Q' into two compartments, one of which coöperates with the set of holes nearest the center of the box and the other with those near its outer edge. In the present instance the inner set of holes coöperates with the feed-spout K and delivers the grain which is to be planted in the hills, while the outer set of holes coöperates with auxiliary feed-spout K''', inclined outwardly from vertical position. Each of these auxiliary feed-spouts K''' is secured at its lower end in a curved spring-arm K³, secured at its upper forward end to one of the arms H of the seedbox and runner-frame, said spring-arm K³ being also connected at its rear end with the under side of the feed-box by a second spring-arm K⁴. The upper end of the spout K''' is not secured to the feed-box, but is left free, the spout being supported solely by the arm K³ at its lower end. The upper end of the spout is enlarged or made flaring, as shown in Fig. 4, so that it will always be in position to receive the grain dropped through the outer set of holes in the dropping-disks. The curved spring-arm K³ operates as a sort of shoe, and when it comes in contact with any slight elevations above the general surface of the ground it is free to yield in an outward direction and pass over them. These auxiliary dropping devices will serve to make a deposit of grain or other marking material upon the surface of the ground immediately opposite the hills which are planted through the main feed-spouts K, so that as the planter is driven back and forth across the field the driver can see not only the lines of the hills previously planted, but can also observe the position of the hills which are being planted on the present trip. If at any time he finds that the dropping devices are dropping the grain out of line with the hills already planted, he can readily remedy the difficulty and adjust them to drop in line with the preceding hills by means of the lever H' and friction-clutch G', controlling the connection of the driving-sprocket F'' with the shaft S. By shifting this sprocket backward or forward upon the shaft S the dropping devices may be readily adjusted to drop the grain at the proper point, as will be readily understood.

I am aware that it has heretofore been proposed to drive the dropping devices of corn-planters by a suitable driving connection with the supporting-wheels of the machine and that this is very commonly and successfully done for the simple "drilling" of corn in straight rows across the field in one direction. I also believe it has been attempted to plant corn in hills in this manner; but so far as I am aware it has never been successfully done, because the supporting-wheels of the machine necessarily followed all of the inequalities of the ground and produced an irregular action of the dropping devices. I am also aware that it is common to employ a special toothed driving-wheel engaging the ground and connected with the dropping devices for the purpose of actuating the latter in the drilling of corn, as above described, and I believe it has also been attempted to plant corn in hills by the employment of such special driving-wheel for actuating the dropping devices; but heretofore no means have been provided for preventing such special wheel from following the inequalities of the ground, just as do the supporting-wheels of the machine in the instance above mentioned, and for the same reasons therefore the dropping devices would be actuated in an irregular manner by such special wheels and render the planting of corn in hills by such means impracticable. In my machine the long shoe or runner which serves to support the toothed wheel bridges the inequalities of the ground and prevents such wheel from following them, so that while the teeth of the wheel are permitted to remain in engagement with the ground sufficiently to turn the wheel at all times (except, perhaps, in exceedingly irregular places) the wheel will nevertheless turn at substantially uniform speed proportionate to the forward travel of the planter and make substantially the same number of revolutions during any given distance of travel. So, too, the provision of the adjusting means in the driving connections between said wheel and the dropping devices enables any irregular action of the latter to be readily corrected.

Having thus fully described my invention, I claim—

1. In a corn-planter, the combination, with the main frame, of a hinged or floating frame flexibly connected thereto, a toothed wheel mounted in said floating frame, a shoe or runner extending longitudinally of the machine and serving to support said hinged frame, and a driving connection between said toothed wheel and the dropping devices of the machine, substantially as described.

2. In a corn-planter, the combination, with the main frame of the machine, of a hinged or floating frame within the main frame and flexibly connected thereto, a runner or shoe extending longitudinally of the machine beneath said hinged frame and serving to support the latter, a toothed wheel mounted in the hinged frame and having its teeth projecting through said shoe or runner to engage the ground beneath the same, and a driving connection between said toothed wheel and the dropping devices of the machine, substantially as described.

3. In a corn-planter, the combination, with the main frame of the machine, of a floating frame within said main frame and flexibly connected thereto, a rotary shaft journaled in said floating frame, a shoe or runner hung upon said shaft beneath said floating frame and extending from front to rear of the machine, a toothed wheel fast upon said shaft, and a driving connection between said shaft and the dropping devices of the machine, substantially as described.

4. In a corn-planter, the combination, with the main frame of the machine, of a hinged or floating frame connected thereto, a toothed wheel mounted in said floating frame, a shoe or runner extending longitudinally of the machine beneath said frame and serving to support the latter, means for adjusting said wheel and runner vertically in relation to each other, to permit the teeth of the wheel to project a greater or less distance below the runner, and a driving connection between said wheel and the dropping devices of the machine, substantially as described.

5. In a corn-planter, the combination, with the main frame of the machine, of a hinged or floating frame connected thereto, a toothed wheel mounted in said floating frame, a shoe or runner hung to said frame beneath the same and extending longitudinally of the machine and serving to support said frame, means upon the main frame for adjusting the floating frame and runner vertically in relation to the main frame, and a driving connection between the toothed wheel and the dropping devices of the machine, substantially as described.

6. In a corn-planter, the combination, with the main frame of the machine, of a hinged or floating frame connected thereto, a toothed wheel mounted in said floating frame, a shoe or runner extending longitudinally of the machine beneath said frame and hung to the latter at a point beneath the axis of the toothed wheel, and having its forward end left free for limited vertical movement independently of the floating frame, and a driving connection between the toothed wheel and the dropping devices of the machine, substantially as described.

7. In a corn-planter, the combination, with the main frame, and the seedbox and runner-frame hinged thereto and the draft-tongue rigidly connected to such seedbox and runner-frame, of a hinged or floating frame located in rear of the seedbox and runner-frame and flexibly connected to the main frame, a toothed wheel mounted in said floating frame, and a driving connection between said toothed wheel and the dropping devices of the machine, a shoe or runner extending longitudinally of the machine beneath said floating frame and hung to the latter at a point beneath the axis of the toothed wheel, a connection between the front end of said shoe or runner and the draft-tongue of the machine which permits limited vertical movement of the front end of the shoe independently of the tongue, and means upon the main frame for lifting the seedbox and runner-frame and thereby causing the draft-tongue to lift the front end of said shoe or runner, and for also lifting the rear end of said runner or shoe, to elevate said runner and the toothed wheel above the surface of the ground, substantially as described.

8. In a corn-planter, the combination, with the main frame and the seedbox and runner-frame hinged thereto and the draft-tongue rigidly connected to such seedbox and runner-frame, of a hinged or floating frame located in rear of the seedbox and runner-frame and flexibly connected to the main frame, a toothed wheel mounted in said floating frame, and a driving connection between said toothed wheel and the dropping devices of the machine, a shoe or runner extending longitudinally of the machine beneath such floating frame and hung to the latter at a point beneath the axis of the toothed wheel, a connection between the front end of such shoe or runner and the draft-tongue of the machine which permits limited vertical movement of the front end of the shoe independently of the tongue, a lever and connections upon the main frame for lifting the seedbox and runner-frame and thereby causing the draft-tongue to lift the front end of said shoe or runner, and a second lever and connections for lifting the rear end of said shoe or runner, substantially as described.

9. In a corn-planter, the combination, with the main frame, of a hinged or floating frame flexibly connected thereto, a shoe or runner extending longitudinally of the machine beneath such floating frame and serving to support the latter, a toothed wheel mounted in the floating frame, a driving connection between said wheel and the dropping devices of the machine, and adjusting means in said driving connection for regulating the action of the dropping devices, substantially as described.

10. In a corn-planter, the combination, with the main frame of the machine, of a floating frame flexibly connected thereto, a shoe or runner extending longitudinally of the machine beneath said floating frame and serving to support the latter, a rotary shaft mounted in the floating frame, a sprocket-wheel upon said shaft, driving connections between said sprocket-wheel and the dropping devices of the machine, and a clutch between the sprocket-wheel and shaft whereby the wheel may be disconnected from the shaft and adjusted about the latter and reconnected to it at will to regulate the action of the dropping devices, substantially as described.

11. In a corn-planter, the combination, with the main frame of the machine, of a floating frame flexibly connected thereto, a shoe or runner extending longitudinally of the machine beneath said floating frame and serving to support the latter, a rotary shaft mounted in the floating frame, a sprocket-wheel upon said shaft, driving connections between said sprocket-wheel and the dropping devices of the machine, a friction-clutch intermediate the sprocket-wheel and shaft, and a lever controlling said clutch, substantially as and for the purpose described.

12. In a corn-planter, the combination, with the main frame A having the front rod B, of the floating frame R hung at its front end upon the rod B, the shoe or runner W extending from front to rear of the machine along the middle line thereof beneath the floating frame R and serving to support the latter, the wheel T mounted in the frame R and having the teeth U projecting through the runner W, and a driving connection between the wheel T and the dropping devices of the machine, substantially as described.

13. In a corn-planter, the combination, with the main frame A having the front rod B, of the floating frame R hung at its front end upon the rod B, the shoe or runner W extending from front to rear of the machine along the middle line of the latter beneath the frame R and serving to support said frame, the rotary shaft S journaled in the frame R, the sprocket F' upon said shaft, the two sprockets J' L' turning together upon the rod B, the chain I' connecting the sprockets F' and J', the rotary shaft O' having the sprocket N' fast upon it, the chain M' connecting the sprockets L' and N', and the dropping devices of the machine actuated by the shaft O', substantially as described.

14. In a corn-planter, the combination, with the main frame A having the front rod B, of the floating frame R hung at its front end upon the rod B, the shoe or runner W extending from front to rear of the machine along the middle line of the latter beneath the frame R and serving to support said frame, the rotary shaft S journaled in the frame R, the sprocket F' upon said shaft, the clutch G' between the sprocket F' and shaft S and the lever H' controlling said clutch, the sprockets J' L' turning together upon the rod B, the rotary shaft O' actuating the dropping devices of the machine, the sprocket N' fast upon the shaft O', and the chains I' and M' connecting the sprockets F' and J' and L' and N', respectively, substantially as described.

15. In a corn-planter, the combination, with the main frame A having the front rod B, of the floating frame R hung at its front end upon the rod B, the shoe or runner W extending from front to rear of the machine beneath the frame R and pivotally hung to the latter, and also serving when resting upon the ground to support said frame, the wheel T mounted in the frame R and having the teeth U projecting through the runner W, and a driving connection between said wheel and the dropping devices of the machine, substantially as described.

16. In a corn-planter, the combination, with the main frame A having the front rod B, of the floating frame R hung at its front end upon the rod B, the shaft S journaled in the frame R, the shoe or runner W extending from front to rear of the machine beneath the frame R and hung upon the shaft S, the wheel T fast upon said shaft and having the teeth U projecting through the runner W, and a driving connection between said shaft and the dropping devices of the machine.

17. In a corn-planter, the combination, with the main frame A having the front rod B and the longitudinal bars C D connecting the rear end of said frame with said front rod, of the seedbox and runner-frame hung upon the rod B, the floating frame R located between the bars C D of the main frame and hung at its front end upon the front rod B thereof, the runner W extending from front to rear of the machine beneath the frame R and serving to support the latter, the wheel T mounted in the frame R and having the teeth U projecting through the runner W, a driving connection between said wheel and the dropping devices of the machine, the lever O upon the main frame and connections for lifting the seedbox and runner-frame and also the front end of the shoe W, and the lever B' upon the main frame and connections for lifting the rear end of the runner W and with it the frame R and the wheel T, substantially as described.

18. In a corn-planter, the combination of the seedbox F separated into two compartments by the partition Q', the perforated disks located in the bottom of said box and provided with two sets of holes coöperating with the two compartments of the box, the runner I and the feed-spout K leading from one compartment of the box to the rear end of said runner, the spring arm or shoe K³, the auxiliary feed-spout K'' supported at its lower end in said shoe and coöperating at its upper end with the other compartment of the feed-box, and suitable means for driving the rotary disk in the bottom of the feed-box, substantially as described.

JOSEPH URBANEK.

Witnesses:
 GEO. H. THOMAS,
 E. A. ROBBINS.